Feb. 7, 1939. W. D. SCHMIDT ET AL 2,146,446
BORING MACHINE
Filed Jan. 27, 1936 6 Sheets-Sheet 2

Inventors
William D. Schmidt
Alfred P. Burns
Lawrence W. Corbett
By
Geo. H. Kennedy Jr.
Attorney Witness
W. McKeon

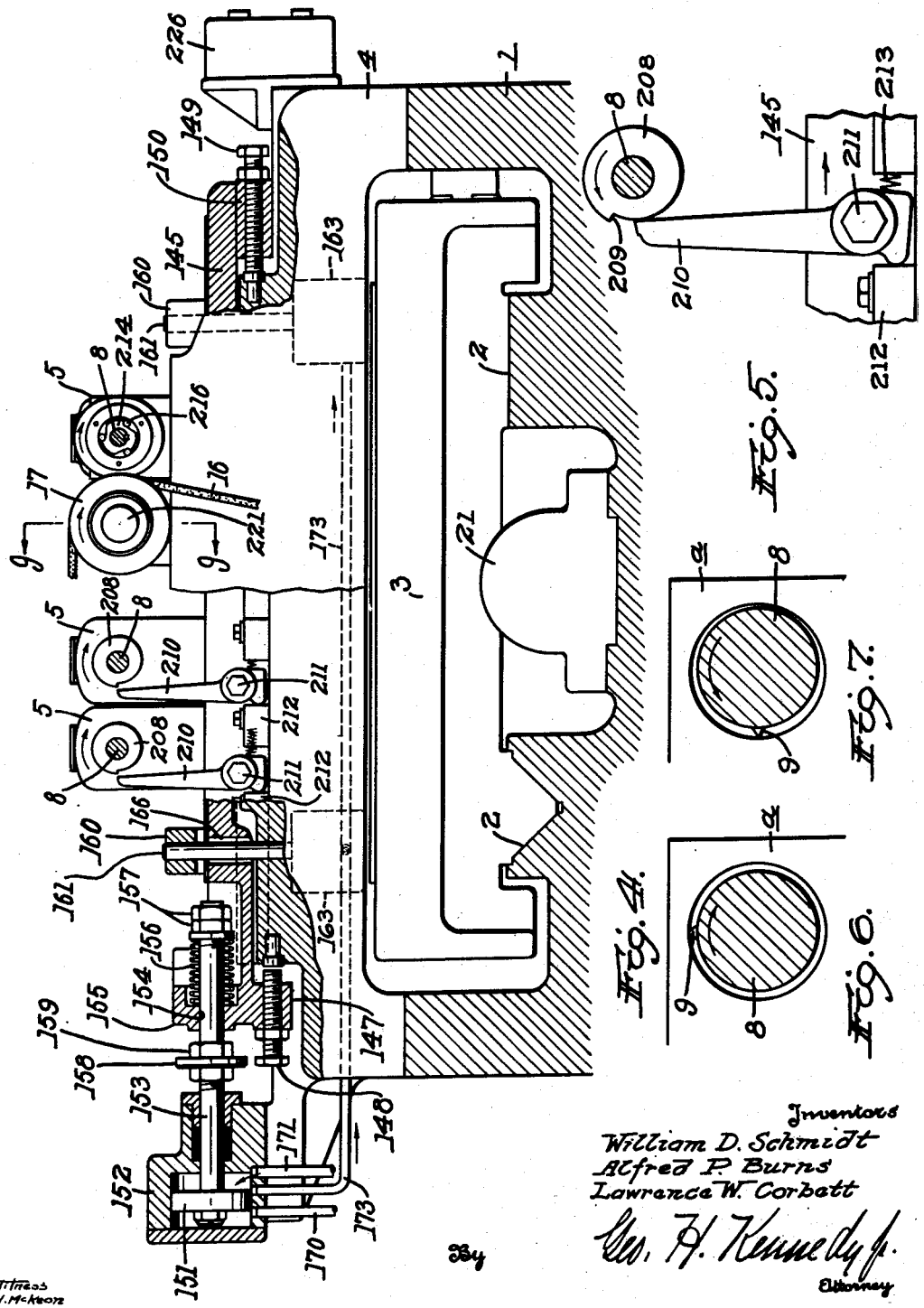

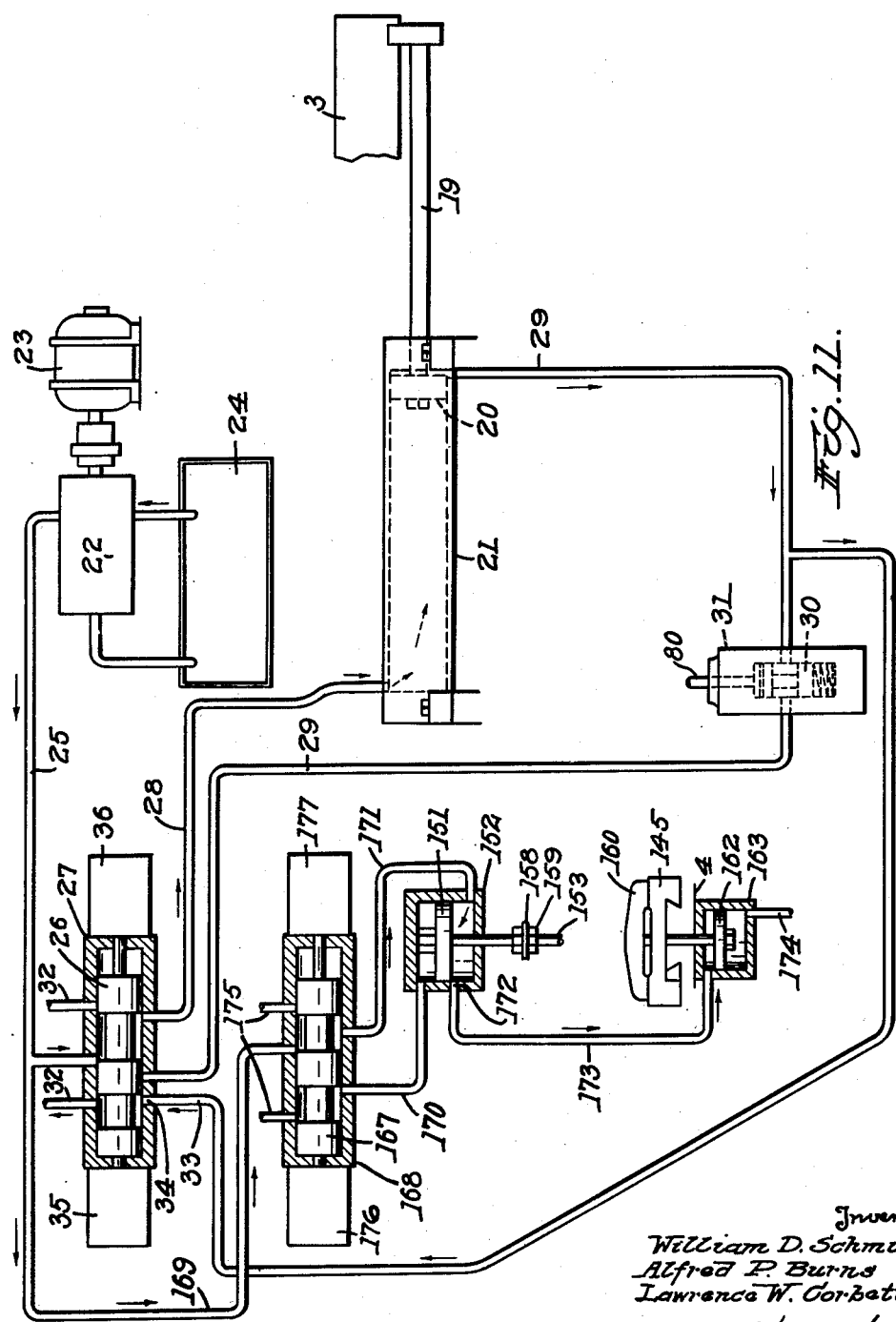

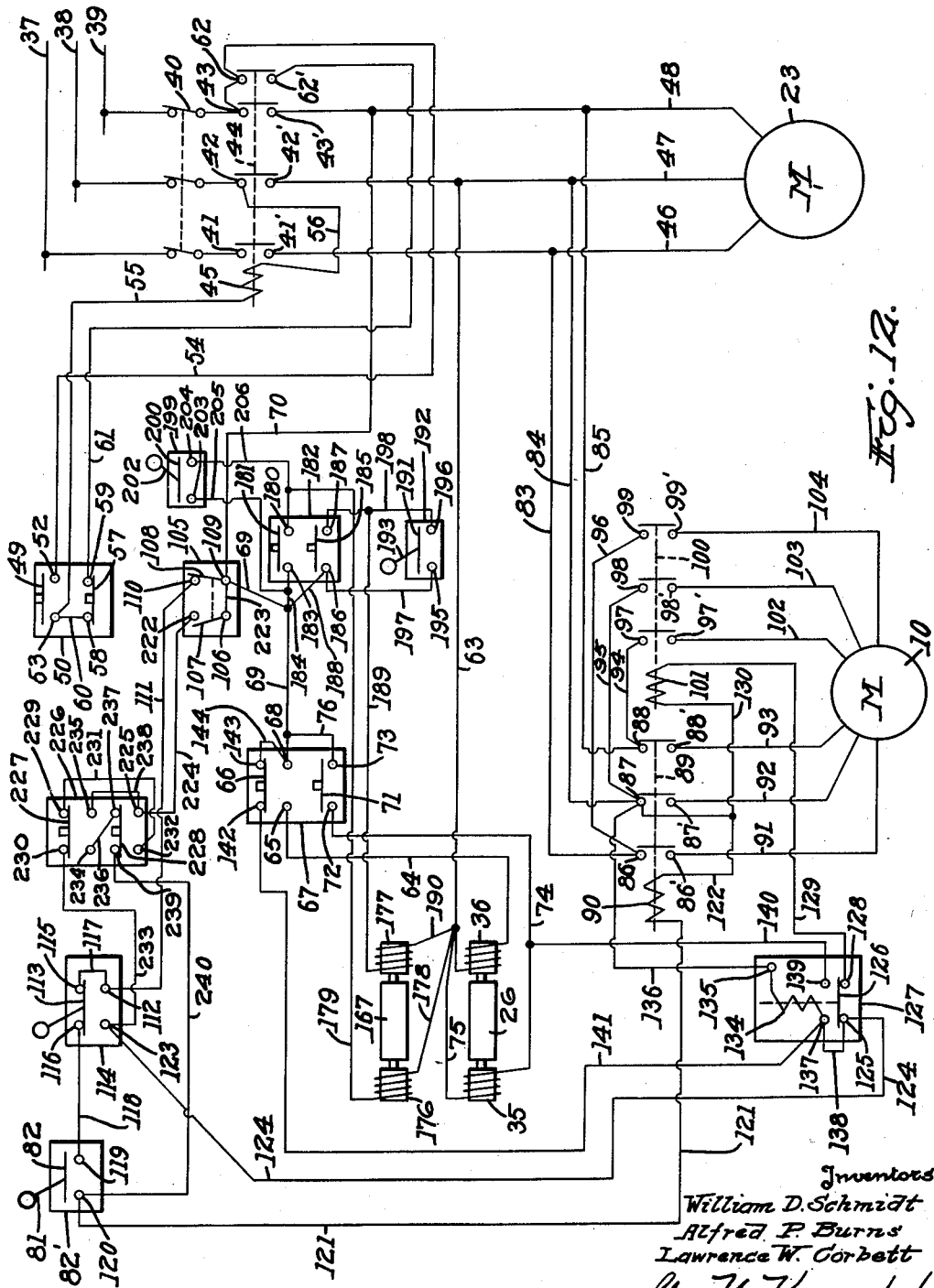

Patented Feb. 7, 1939

2,146,446

UNITED STATES PATENT OFFICE 2,146,446

BORING MACHINE

William D. Schmidt, Alfred P. Burns, and Lawrence W. Corbett, Worcester, Mass., assignors to The Heald Machine Company, Worcester, Mass., a corporation of Massachusetts Application January 27, 1936, Serial No. 60,916

13 Claims. (Cl. 77—3)

The present invention relates to boring machines and particularly to a structure which provides for a radial separation or back-off between the surface of the workpiece and the cutting tool after completion of the boring operation, to avoid contact between said tool and the finished surface of the workpiece while the tool is being withdrawn from within the bore of the workpiece.

In prior devices of this character, the workpiece is mounted in or on a suitable work-supporting device, and the boring tool is carried in the end of a rotatably driven boring spindle. A relative movement between the workpiece and the boring spindle, in a direction parallel to the spindle axis, carries the tool over the inner surface of the workpiece for a boring operation thereon. The tool and workpiece are preferably so mounted that the workpiece is reduced to the desired size during a single axial movement of the boring tool over the surface to be bored, the boring tool and workpiece then being separated in a direction parallel to the spindle axis to withdraw the spindle from within the workpiece bore.

If the boring tool is rotated during the withdrawal movement, the cutting edge of the tool leaves a helical groove in the finished surface of the workpiece, since the movement of separation occurs at a more rapid rate than the relative movement during boring. If the boring tool is brought to rest before withdrawal, the cutting edge of the tool forms a groove in the finished surface of the workpiece parallel to the axis of the bore. Although neither of these grooves is generally detrimental to the usefulness of the finished workpiece, such grooves do affect the salability of the workpiece and in certain cases, where the bore forms a cylinder for pumps or engines, the groove is of sufficient depth to be objectionable in the subsequent use of the workpiece. One of the principal objects of the present invention is, accordingly, to provide a machine by which the objectionable grooves above referred to may be eliminated.

A structure by which the axially extending groove may be entirely eliminated is disclosed in the copending application of Schmidt, (one of the present inventors), Serial No. 705,406, filed January 5, 1934 (now Patent No. 2,058,359), or his copending application Serial No. 713,700, filed March 2, 1934 (now Patent No. 2,058,360). In the device disclosed in either of these applications, the structure by which the boring tool is withdrawn from or advanced into work-engaging position is incorporated in the boring spindle and the shifting movement of the tool into or out of operative position is controlled by the starting and stopping of the tool spindle, the tool being moved by centrifugal force, or by reversing the rotation of the tool spindle, the tool being then moved by the inertia of the tool carrying member in the spindle. In either construction, the mechanism, being incorporated within the boring spindle, results in a less rigid spindle and support for the tool in the spindle than would result if the spindle were a solid bar with the tool adjustably mounted in the end thereof. The structure disclosed in either of these applications is entirely satisfactory in use except for the above noted objection which may become apparent where the workpiece bores are of a relatively small diameter or where the length of the bore is relatively large as compared to the diameter, in each of which cases a solid spindle is desirable for rigidity.

Where the work is rotated and the spindle is held against rotation and thus projects at all times in a predetermined direction radially of the boring head, a back-off of the tool to avoid contact between the tool and the work during the axial separation may be obtained by a relative transverse shifting of the boring head as a unit relative to the work supporting structure in a direction to withdraw the tool from alinement with the surface being bored. This same arrangement is not however applicable in machines where the boring tool is rotated, since the boring spindle does not necessarily stop with the tool projecting in the same predetermined direction and a back-off in such an event may result in causing the tool to dig more deeply into the surface of the workpiece rather than to be withdrawn from engagement therewith.

There are a large number of uses for boring machines where the workpiece is of a character which cannot be rotated either because the workpiece is too cumbersome, or because, in certain instances, a multiplicity of boring tools operate simultaneously on spaced bores of a single workpiece, as in the boring of all of the cylinders of a cylinder block at one time. In an arrangement of this character, the boring spindles are necessarily rotated, and the back-off by shifting of the entire boring head or set of boring heads as a unit, will not procure the desired separation between the tools and the work since the several boring tools obviously do not all extend in the same predetermined direction when the spindles are stopped. It is accordingly a further object of the present invention to provide a machine accordingly which is equally applicable to either single or multiple head boring machines so that the boring heads may be shifted as a unit relative to the workpiece with the tool or tools all withdrawn from contact with the bored surface.

The device of the present application, which is arranged to assure the stopping of the rotation of the boring head with the tool always projecting in the same direction relative to the machine, is applicable not only to machines for boring one workpiece opening at a time, but to machines for the boring of a plurality of openings in one or more workpieces, and is operable independently of variations in the diameters of the openings being bored so that several openings of varying diameters may be bored in a single boring operation.

Other and further objects and advantages of the invention will appear from the following detailed description, taken in connection with the accompanying drawings, in which—

Fig. 4 is a vertical sectional view along the line 4—4 of Fig. 2.

Fig. 5 is a fragmentary elevation, on a larger scale, of a part of the mechanism of Fig. 4.

Fig. 6 is a sectional view through the work showing the position of the boring spindle when in boring position.

Fig. 7 is a view similar to Fig. 6 with the boring spindle in a position for the withdrawal of the tool from the workpiece.

Fig. 8 is a fragmentary sectional view along the line 8—8 of Fig. 2.

Fig. 9 is a sectional view through the end of one of the boring spindles along the line 9—9 of Fig. 4.

Fig. 10 is a sectional view along the line 10—10 of Fig. 9.

Fig. 11 is a fluid pressure diagram.

Fig. 12 is a wiring diagram.

Like reference characters refer to like parts in the different figures.

Figure 1:
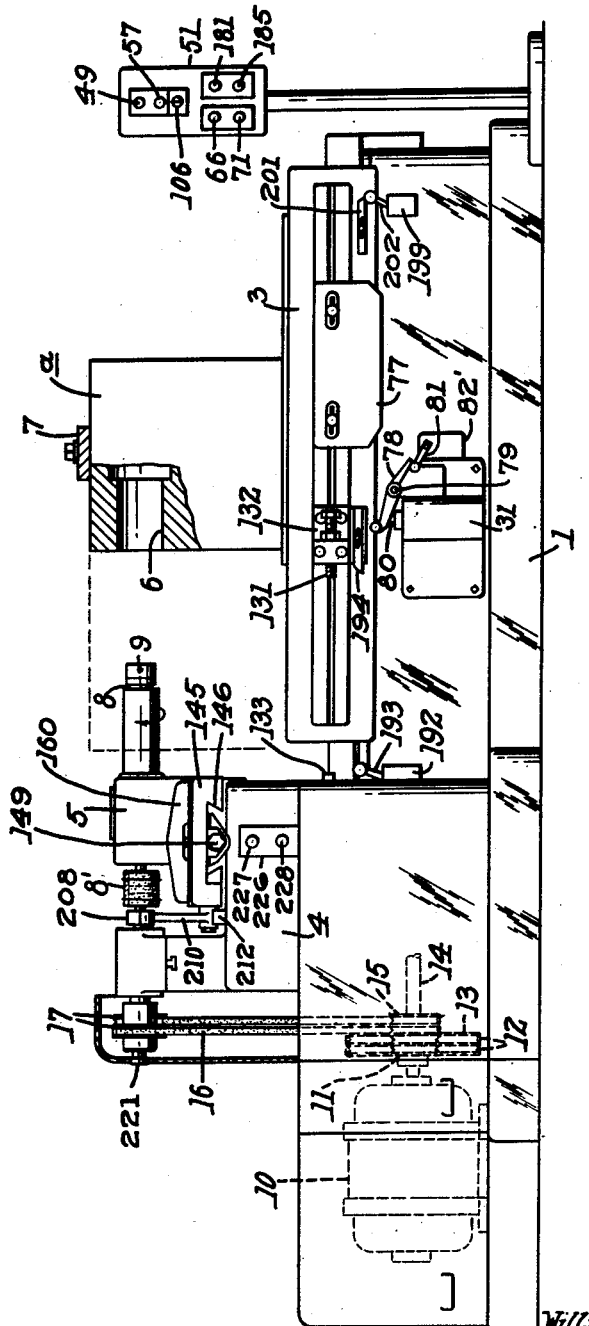
Fig. 1 is a front elevation of a machine embodying the invention.

Referring first to Fig. 1, the machine comprises a base 1 having guideways 2, Fig. 4, upon which a table or carriage 3 is longitudinally slidable. A bridge 4 on the left hand end of the base spans the guideways provided for the movement of the table 3 and supports one or more tool heads 5 in axial alinement with the bores 6 of a workpiece $a$ suitably secured, as by a clamp 7, on the table 3. The device will hereinafter be described with particular reference to only one of the tool heads, but it will be apparent that each of the tool heads functions in an identical manner. Either the workpiece, or the tool head, may be mounted on the table, since the function of the later is to provide for relative axial movement between the tool head and the workpiece. The tool head is shown as mounted on the bridge merely by reason of the more complex construction of the tool head and its associated mechanism.

Figures 2, 3:
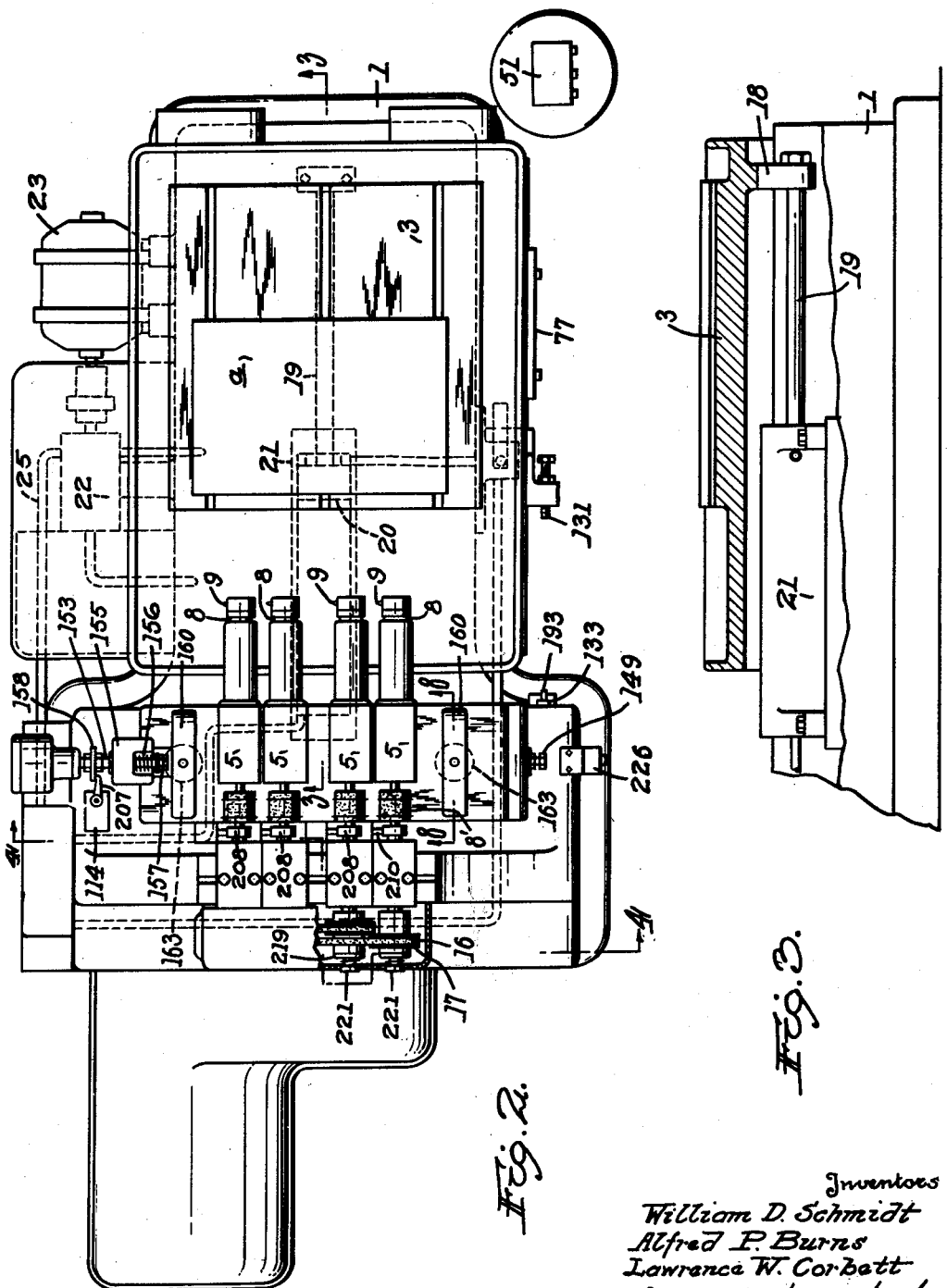
Fig. 2 is a plan view of the machine.
Fig. 3 is a fragmentary vertical sectional view on the line 3—3 of Fig. 2.

Each tool head 5 has journalled therein a rotatable boring spindle 8 in the outer or right hand end of which is adjustably mounted, radially thereof, a boring tool 9, the cutting edge of the latter projecting beyond the periphery of the spindle, as best shown in Fig. 2. The spindle or spindles 8 are all driven from a reversible electric motor 10, having a pulley 11 on the rotating shaft thereof. The pulley is connected by a plurality of V-belts 12 to a large diameter pulley 13 on a countershaft 14 in the base of the machine. The countershaft 14 also carries one or more pulleys 15 which are connected by V-belts 16 to the tool spindles 8 through a flexible connection 8', each of the spindles having a pulley 17 engageable by one of the V-belts 16.

The table 3 is shifted, preferably by fluid under pressure, for procuring the relative axial movement between the workpiece $a$ and the boring tools. To this end, as shown in Fig. 3, the table has an integral depending lug 18 to which is connected the piston rod 19 of a piston 20, Fig. 11, mounted in a cylinder 21 secured to the base. Referring now to Fig. 11, a fluid pump 22 driven by an electric motor 23 (see also Fig. 2) supplies fluid under pressure from a tank 24 through a conduit 25 to a table control valve 26 in a valve casing 27. The left and right hand ends of the table cylinder 20 are connected to the valve casing 27 by conduits 28 and 29 respectively, the latter having a throttle valve 30 vertically slidable in a casing 31 and operating to reduce the rate of travel of the table during the boring operation, as will hereinafter appear. Spaced exhaust outlets 32, preferably connected to the tank 24, are provided in the valve casing 27 for the exhaust of fluid from the table cylinder. When the table is in the right hand end position of Fig. 1, the valve 26 is at the left hand end of its movement, as shown, thereby providing fluid connection directly from the pump to the left hand end of the table cylinder for holding the table at the right hand end of its movement.

A bypass conduit 33 between the right hand end of the table cylinder and a port 34 in the control valve casing 27 is open to exhaust when the valve 26 is in its left hand position, to permit movement of the table to the right at maximum speed. The port 34 is closed when the valve 26 is shifted to the right, so that movement of the table to the left during the boring operation is under the control of the throttle valve 31.

The valve 26, which is preferably located at the back of the machine, is shifted either manually or automatically by solenoids 35 and 36 positioned at opposite ends of said valve. As shown in the wiring diagram of Fig. 12, electrical power is supplied from three power lines 37, 38 and 39. A main switch 40, manually operated and normally closed, connects the lines 37, 38 and 39 to the contacts 41, 42 and 43, respectively, of a normally open switch 44 controlled by a solenoid 45. The other contacts 41', 42' and 43' of the switch 44 are connected by leads 46, 47 and 48 to the pump motor 23, for operation of said motor when the switch 44 is closed. The switch 44 is closed by means of a hand operated push-button switch 49 (see also Fig. 1), in a switch box 50 mounted in a standard 51. Closing of the switch 49 provides a connection between contacts 52 and 53 in the switch box, the contact 52 being connected by a lead 54 to the contact 43. The contact 53 is connected to one side of the solenoid 45 by a lead 55, and the other side of the solenoid is connected by a lead 56 to the contact 42. When the switch 49 is closed, it energizes the solenoid 45 for closing the switch 44, thereby supplying power to the pump motor 23 through the leads 46, 47 and 48.

The pump motor is manually stopped when the boring operations are completed, or when the machine is to remain idle, as at the end of a day's work, by opening a normally closed push-button switch 57. This switch is in the same switch box 50 as the switch 49, and is thus located in the standard 51. The switch 57 normally connects spaced contacts 58 and 59, the former being connected by a lead 60 to the contact 53, which, as above stated, is connected through lead 55 to the solenoid 45. The contact 59 is connected by a lead 61 to a contact 62' which is connected by a part of switch 44 to a contact 62 when the switch 44 is closed. The contact 62 is located on the lead 54, above referred to. The closing of switch 44 connects contacts 62 and 62' so that the circuit through the solenoid 45 is closed so long as both switches 57 and 44 are closed, even though the push-button switch 49 is released. The opening of switch 57 for stopping the pump motor breaks the circuit through the solenoid 45, deenergizing the solenoid so that the switch 44 is opened.

The pump motor having been started, the table control valve 26 is shifted to the right hand end of the casing 27 for moving the table to the left for a boring operation, the valve being shifted by energizing the solenoid 36. One terminal of the solenoid 36 is connected by a lead 63 to the lead 47, and the other terminal of the solenoid is connected by a lead 64 to a contact 65 forming a part of a push-button switch 66 in a switch box 67 in the standard 51. The opposite contact 68 of the switch 66 is connected by leads 69 and 70 to the lead 48. When the machine is at rest, the switch 66 is in the position shown, so that the table control valve 26 is at the left hand end of its casing. When the switch 66 is actuated to connect the contacts 65 and 68, the solenoid 36 is energized and the valve 26 is shifted to the right, so that the table 3 begins its movement to the left to carry the workpiece into operative relation to the boring tool. The table is reversed automatically after the boring operation as will be pointed out later. In setting up the machine, or in the operation of the machine by manual control, return of the table to rest position under the control of a switch 71, which can reverse the table in any position, and may be used for reversal of the table movement after the tool has passed over the surface being bored. Referring again to Fig. 12, the switch 71, which is normally open, has two contacts 72 and 73, the former connected by a lead 74 to one terminal of the solenoid 35. The other terminal of the solenoid is connected by a lead 75 to the lead 63. The contact 73 has a lead 76 connecting it to the lead 69, and closing of switch 71 thus establishes a circuit through the solenoid 35 to shift the valve 26 to the left for reversal of the table movement.

Referring now to Fig. 1, as the table moves to the left a cam 77 adjustably mounted on the front of the table, engages and turns counterclockwise a lever 78 journaled on a stud 79 on the front of the base. One arm of the lever being in engagement with the valve stem 80 of the throttle valve 30, the movement of the lever shifts said valve downwardly to reduce the flow of fluid to the right hand end of the cylinder 21 for reducing the rate of travel of the table to the left. The other arm of the lever 78, when moved counterclockwise, releases the control arm 81 of a switch 82 in a box 82' mounted on the base of the machine, to start the rotation of the motor 10 which drives the boring spindles so that the spindles are rotating during the movement of the work past said tools.

Referring to Fig. 12, the boring spindle motor 10 is connected to the power supply for rotation in either direction. The leads 46, 47 and 48 are connected by leads 83, 84 and 85 to contacts 86, 87 and 88 respectively of a switch 89 controlled by a solenoid 90 and normally open. The opposite contacts 86', 87' and 88' are connected by leads 91, 92 and 93 to the motor 10. The contacts 86, 87 and 86 are connected, in the order stated, by leads 94, 95 and 96 to contacts 97, 98 and 99 of a normally open switch 100 controlled by a solenoid 101. The opposite contacts 97', 98' and 99' of the switch 100 are controlled by leads 102, 103 and 104 to the motor 10. Thus the motor 10, when connected to the power supply through the switch 100, rotates in a direction opposite to its rotation when connected through switch 89.

The motor 10 is automatically or manually controlled, the parts being shown in the position for automatic control. Again referring to Fig. 12, the standard 51 has a switch box 105 in which is mounted a switch 106 having two connectors 107 and 108 arranged for movement as a unit. The connector 108 is for automatic control of the motor 10 and normally establishes connection between contacts 109 and 110. The contact 109 is connected to the lead 70 and the contact 110 is connected by a lead 111 to a contact 112 of a switch 113 normally in the position shown, and located in a box 114 on the bridge. The switch 113 which reverses the rotation of the boring spindles in response to the movement of a cross-slide, hereinafter described, on the bridge, normally provides a connection between contacts 115 and 116 of the switch. The contact 115 is connected by a lead 117 to the contact 112 and the contact 116 is connected by a lead 118 to one of the contacts 119 of the switch 82, above referred to. The other contact 120 of the switch 82 is connected by a lead 121 to one terminal of the solenoid 90 which closes the switch 89 for energizing the boring head motor 10. The other terminal of the solenoid 90 is connected by a lead 122 to the contact 87 forming part of the switch 89. The switch 113 is normally in the position of Fig. 12, and when the switch 82 is closed during the movement of the table to the left, the solenoid 90 is energized, closing the switch 89 for procuring a rotation of the tool head or tool heads for the boring operation.

As above stated, the switch 113 is automatically moved for reversing the boring spindles. In the opposite position of said switch, connection is provided between the contact 112 and a contact 123. The contact 123 is connected by a lead 124 to a contact 125 forming part of a delay or time-controlled switch 126 in a box 127. The switch 126 normally connects contacts 125 and 128, the latter connected by a lead 129 to one terminal of the solenoid 101. The other terminal of the solenoid 101 is connected by a lead 130 to the lead 122 and thence to the contact 87. Thus when the switch 113 is moved from the position shown, into the opposite position, the solenoid 90 is deenergized, opening switch 89, and the solenoid 101 is energized to close the switch 100 for reversing the boring spindles. This reversal of the boring spindles is used to locate the boring tools all in the same position relative to the tool heads, as will be hereinafter pointed out.

As the table reaches the left hand end of its movement an adjustable stop screw 131, Fig. 1, carried by a block 132 on the front of the table, engages a fixed stop 133 on the base. At this time the boring tools 9 have passed through the bore of the workpiece and are now out of engagement with said bore, the tools being then in the portion of the work having a larger diameter, as indicated. The table remains in this position long enough for the tools to be backed away from alinement with the surface being bored. The table is then returned to the inoperative position shown through the operation of the time-controlled switch. Again referring to Fig. 12, the delay switch 126 is controlled by a solenoid 134 in the box 127. One terminal of this solenoid is connected to a contact 135 and thence by a lead 136 to the contact 87. The other terminal of the solenoid is connected to a contact 137 which is connected to the contact 125 by a lead 138.

The movement of the switch 113, which, as above stated, is automatically shifted while the table is at the left hand end of its movement, thus energizes the time-controlled switch, which becomes operative a predetermined time after energization for shifting the switch 126 from the position shown to a position connecting the contact 137 and a contact 139. A lead 140 connects the lead 74 to the contact 139. The contact 137 is connected by a lead 141 to a contact 142 forming part of switch 66 and engaged thereby when said switch is in normal position. A contact 143 also engaged by switch 66 is connected by a lead 144 to the contact 68 and thence to the lead 69. The operation of the time-controlled switch 126 thus closes a circuit through the solenoid 35, shifting the valve 26 to the left for movement of the table to the right to the rest position shown.

Figures 8, 9, 10:
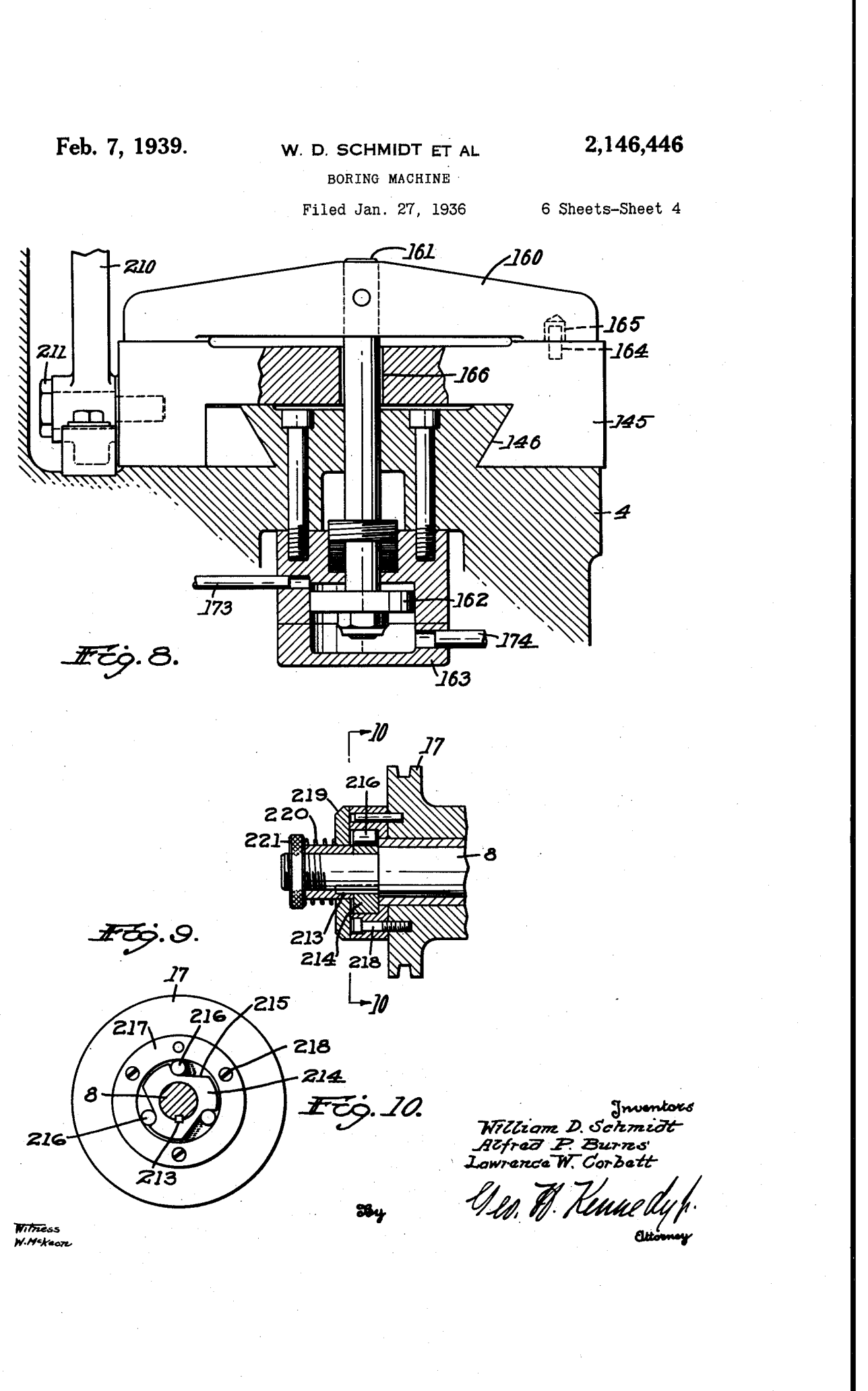

Before the table is returned to its right hand inoperative position, the boring tools are backed away from the workpiece to assure a separation of the tools from the workpiece, thereby avoiding the objectionable grooves above referred to. Referring now to Figs. 1 and 4, the tool heads 5 are carried on a cross-slide 145 mounted on ways 146, Figs. 1 and 8, provided by the bridge 4. A depending lug 147 at the rearward end of the cross-slide carries an adjustable screw 148 by which the forward movement of the cross-slide is limited, and a similar adjustable screw 149 is carried by a block 150 secured to the underside of the cross-slide at the forward end thereof to limit the rearward movement of the slide. Said adjustable screws engage with parts of the bridge 4, as shown.

The movement of the cross-slide is procured by fluid under pressure through a piston 151 slidable in a cylinder 152 secured to the bridge 4. The piston rod 153 extends through a bore 154 in a lug 155 provided by the cross-slide, and a spring 156 is positioned between said lug and locking nuts 157 on the end of the piston rod. On the side of the lug 155 opposite to the spring 156, the piston rod 153 has a collar 158, the position of which is adjustable by means of clamping nuts 159, one of which engages with the lug 155 during the forward movement of the piston rod. During the boring operation, the cross-slide is held in the rearward position of Fig. 4, and since the piston 151 has a greater travel than the cross-slide, the coil spring 156 is under tension when the parts are in the position of Fig. 4, the spring urging the table into the rearward position shown.

In its rearward position, the cross-slide is clamped against movement by clamping bars 160 located adjacent the front and back ends of the cross-slide. As best shown in Fig. 8, each clamping bar 160 is carried on the upper end of a piston rod 161 extending upwardly from a piston 162 slidable in a cylinder or casing 163 secured to the bridge on the underside thereof. Fluid under pressure is normally directed to the upper end of each cylinder 163 for holding the bar in clamping position. A pin 164 projecting upwardly from the cross-slide engages in an opening 165 in the clamping bar to prevent turning movement thereof. As will be apparent, the cross-slide has a slot 166 therein through which the piston rod 161 projects, said slot being large enough to provide for movement of the cross-slide relative to said piston rod.

Referring now to Fig. 11, fluid under pressure to the cylinder 152 is controlled by a valve 167 in a casing 168. Fluid under pressure is supplied to said valve through a conduit 169 connected to the conduit 25 and the rearward and forward ends of the cylinder 152 are connected to spaced ports in the casing 168 by conduits 170 and 171, respectively. The valve 167 is normally in the position shown, in which position fluid under pressure is supplied to the forward end of the cylinder 152, thereby holding the cross-slide in the rearward or boring position of Fig. 4. Shifting of the valve 167 directs fluid to the rearward end of the cylinder 152 for shifting the cross-slide.

The cylinder 152 has a port 172 which is uncovered by the piston 151 when the latter reaches the end of its movement in the rearward direction. Said port 172 is connected by a conduit 173 to the upper end of the cylinder 163 from the cylinder 152, and fluid under pressure thereby urges the clamp 160 downwardly for holding the cross-slide against movement from its rearward position. The lower end of the cylinder 163 is connected by an exhaust pipe 174 to the tank 24. It will be noted that fluid under pressure is admitted to the upper end of the cylinder 163, for actuating the clamping bars, only after the cross-slide has reached the end of its movement in the rearward direction.

For procuring the back-off, which, as above stated, involves a forward movement of the cross-slide, the valve 167 is shifted to the right by either manually or automatically actuated controls, as hereinafter pointed out, establishing fluid pressure connection to the rearward end of the cylinder 152 and allowing fluid from the forward end of the cylinder to exhaust through one of the spaced exhaust ports 175 provided in the casing 168. As the piston 151 moves forward, it closes port 172 to release the clamping bars 160. Since the clamping nut 159 is spaced from the lug 155, the piston 151 is allowed to travel far enough to close the port 172 before it begins to move the cross-slide. After the clamping nut 159 engages the lug 155, the cross-slide, being now unclamped, is moved forwardly until the adjustable screw 148 engages the bridge. The amount of cross-slide movement shown is greatly exaggerated, as it need only move a distance great enough to space the boring tool from the surface of the work.

Referring now to Fig. 12, the position of the valve 167 is controlled by solenoids 176 and 177 located at opposite ends thereof. The solenoid 176 at the left hand end of the valve has one terminal thereof connected by a lead 178 to the lead 63, and the other terminal of the solenoid is connected by a lead 179 to a contact 180 forming part of, and engageable by, a push-button switch 181 in a switch box 182 in the standard 51. A second contact 183 for the switch 181 is connected by a lead 184 to the lead 69 and thence to the supply lead 48. The switch 181 is normally in the open position shown, and closing of said switch shifts the valve 167 to its left hand position.

When the back-off of the boring spindles is procured, a second push-button switch 185 in the switch box 182, this switch being normally open, provides a connection between contacts 186 and 187 forming part of the switch. The contact 186 is connected by a lead 188 to the lead 69 and the contact 187 is connected by a lead 189 to one terminal of the solenoid 177. The other terminal of the solenoid 177 is connected by a lead 190 to the lead 63. The switch 185, when closed, establishes a circuit through the solenoid 177 and the valve 167 is shifted to the right for movement of the cross-slide forwardly, as above pointed out.

The movements of the slide on which the boring tools are mounted, instead of being manually controlled may be procured automatically. To this end, the base of the machine carries a switch 191 in a switch box 192, the actuating lever 193 of the switch being in a position for engagement by a cam 194 on the table when the latter reaches the left hand end of its movement. The cam 194 closes the switch 191, thereby establishing connection between contacts 195 and 196 in the switch box. Contacts 195 and 196 are connected by leads 197 and 198 to the contacts 186 and 187 respectively, the latter connection being through a part of the lead 189. Automatic closing of the switch 193 is accordingly the equivalent of the manual closing of the switch 185 so that the solenoid 177 is thereby energized for procuring a forward movement of the cross-slide.

When the cross-slide movement is automatically controlled, the cross-slide is restored to its rearward or boring position when the table reaches the rest position of Fig. 1. For this purpose a switch box 199 on the front of the machine has a switch 200 which is normally open. The switch 200 is actuated by a cam 201, Fig. 1, carried by the table through an actuating lever 202, said cam closing the switch as the table approaches the rest position shown. Referring again to Fig. 12, the switch 200 has spaced contacts 203 and 204 connected respectively by a lead 205 to the lead 184 and by a lead 206 to the lead 179. The automatic closing of the switch 200 thus has the same effect as the manual closing of the switch 181, which, as above stated, energizes the solenoid 176 for shifting the valve 167 to the left and procuring a movement of the cross-slide to its rearward or boring position.

The boring spindles 8, during the boring operation, are necessarily concentric to the bores of the workpiece, as indicated in Fig. 6, and accordingly, unless the boring tools 9 all extend in the same direction relative to the machine when the cross-slide is shifted forwardly for the back-off all of the tools will not be properly withdrawn from alinement with the bore of the workpiece. The proper position for each of the boring tolls 9 in the boring spindle, when the tools are to be backed away from the workpiece is best shown in Fig. 7, where it will be apparent that the boring tools must all extend radially of the spindle in a direction parallel to the plane of the movement of the cross-slide and must also extend toward the rear of the machine so that the forward movement of the cross-slide will assure a separation of the cutting edge of the tool radially from the inner surface of the workpiece.

In order that the boring tools in the several spindles may all be properly located, the spindle rotation is reversed after the boring operation is completed and latches are provided for engagement with said spindles to stop the reversed rotation when the tools on the spindles all extend in the proper direction. During the forward movement of the piston 151 for shifting the cross-slide, the collar 158 engages the actuating arm 207 of the switch 113, the box 114 of which is positioned on the bridge 4 adjacent to the collar, as best shown in Fig. 2. The shifting of the switch 113 preferably occurs during the forward movement of the piston 151 before the cross-slide is moved thereby. The actuation of switch 113 reverses the boring spindles as above pointed out.

Referring to Figs. 2 and 4, each boring spindle has a collar 208 in the form of a cam having an abrupt shoulder 209 engageable with a latch 210 on the bridge, each spindle having a separate latch as indicated. Each latch 210 is pivoted on a stud 211 secured to the bridge and extends upwardly with its free end adjacent to the collar 208. The latch is held in inoperative position when the cross-slide is in boring or rearward position by a lug 212 on the bridge 4, said lug engaging with the lower end of the latch. As the cross-slide moves forwardly, for the back-off, the latch moves away from the lug 212 and the latch is then turned clockwise, Fig. 4, to bring the upper end of the latch into position for engagement with the shoulder 209. A coil spring 213 urges each latch resiliently into operative position. The boring spindles having been reversed by the switch 113 before the latches become operative, the latches thus stop each boring spindle when the tool therein extends toward the rear of the machine in a plane parallel to the plane of movement of the cross-slide.

To prevent slipping of the belts which drive the spindles, after the latches are operative, the pulley 17 for each spindle is connected through a one-direction clutch. As best shown in Figs. 9 and 10, the end of the boring spindle 8 has secured thereto, as by a key 213, the inner member 214 of a one-direction clutch. Said inner member has notches 215 in each of which is positioned a roller 216. Surrounding the member 214 is an annular member 217 secured by bolts 218 to the pulley 17 which is free on the spindle 8. A ring 219 engages with the ends of the member 217 and is held thereagainst by a spring 220 positioned between said ring and an adjustable thumb nut 221 on the threaded end of the spindle. The ring 219 is held against turning movement on the spindle 8 and thus provides a friction clutch between said ring and the member 217. When the pulley 17 is rotated clockwise, Fig. 10, to drive the boring spindles in the proper direction for the boring operation, the rollers 216 are tightly wedged, by the notches 215, between the members 214 and 217 so that a positive drive of the spindle results from the rotation of the pulley. When the driving motor is reversed the pulley 17 turns counterclockwise, turning the spindle 8 counterclockwise therewith by means of the frictional drag between the ring 219 and the member 217 until the latch 210 engages with the shoulder 209 to stop the counterclockwise rotation of the boring spindle. The pulley 17 is free to continue its counterclockwise rotation until the motor for the boring spindle is either stopped or again reversed for driving the spindles in the direction for boring. By this arrangement wear on the driving belts is eliminated since the pulley 17 is free to turn counterclockwise even when the boring spindle is held against counterclockwise turning.

When the machine is being set up the rotation of the boring spindle is manually controlled and this manual control is equally applicable during the operation of the machine if the operator wishes to control the machine movements manually. For manual control of the boring spindles the switch 106 is shifted so that the connector 107 engages with the contact 222, Fig. 12. The connector 107 is normally connected by a lead 223 to the contact 109 and the contact 222 has a lead 224 to a contact 225 in a switch box 226, the latter being located in the front of the bridge, as shown in Fig. 1. The switch box 226 has two switches 227 and 228, both of the push button type. The switch 227 normally provides a connection between contacts 229 and 230, the former connected by a lead 231 to a contact 232. The contact 230 is connected by a lead 233 to the contact 123 in the switch box 114. The switch 227, when depressed, establishes connection between contacts 234 and 235, the former connected by a lead 236 to a contact 237 and the latter being connected by lead 238 to the contact 225. The switch 228 in its normal position provides a connection between a contact 239 and the contact 237, the former being connected by a lead 240 to the contact 120 of the switch 82. When the switch 228 is depressed it establishes a connection between contacts 232 and 225, the former, as above stated, being connected by the lead 231 to the contact 229, and the latter being connected by the lead 224 to the contact 222. With the switches 227 and 228 in the position shown, the boring motor 10 is not energized and the control switches 89 and 100 are both open. To procure a rotation of the boring motor in a direction for boring, the switch 227 is depressed and the switch 106 being closed, establishes a connection through the solenoid 90 (the switch 228 being in the position shown), thereby closing the switch 89 for rotation of the boring motor. Similarly, for reversal of the boring motor the switch 228 is depressed, thereby closing a circuit through the solenoid 101 for closing the switch 100. As these are both push button switches they are both normally in the position shown and the boring head motor accordingly rotates only so long as either of these buttons is depressed.

The operation of the machine will be apparent from the foregoing description, but will be briefly summarized. With the machine completely automatic it is started by closing the switch 49, thereby starting the pump motor 23. The work having been positioned on the table the latter is moved to the right by closing the switch 66 which energizes the solenoid 36 and starts the movement of the table to the left. During this movement the cam 77 closes the switch 82 for a rotation of the boring spindles in the proper direction for boring. The table continues to move to the left until it is brought to rest by engagement between the fixed stop 133 and the adjustable screw 131. At this time the switch 191 is closed by the cam 194, thereby energizing the solenoid 177 for procuring the forward movement of the cross-slide on which the boring members are mounted. During the forward movement of the piston which shifts the cross-slide the switch 113 is shifted by said piston for energizing the solenoid 101 to reverse the rotation of the boring motor. The shifting movement of the switch 113 also opens the circuit through the solenoid 90, thereby opening the switch 89 before the switch 100 is closed. Movement of the switch 113 also sets in operation the switch 126 which operates a predetermined time after it is set in operation for closing the circuit through the solenoid 35, thereby procuring a runout of the table to the right to rest position. The movement of the switch 126 also opens the circuit through the solenoid 101 to open the switch and stop the boring motor. Just before the table comes to rest the switch 200 is closed, thereby energizing the solenoid 176 for shifting the cross-slide toward the rear into boring position. The rearward shifting movement of the cross-slide resets the switch 113, thereby deenergizing the time controlled switch 126 in readiness for a subsequent operation thereof. The switch 113 also when restored to original position, establishes a connection between the contacts 115 and 116 so that the subsequent closing of the switch 81, when the table next moves to the left, will complete a circuit through the solenoid 90 to start the boring motor.

During the forward movement of the cross-slide above referred to, the latches 210 are released and engage with the shoulders 209 on the boring spindles, the latter at this time being rotated in a direction opposite to the direction of rotation for boring, thereby assuring the proper location of each of the boring tools. When the tools are in proper position for the back-off they are all located as shown in Fig. 2, all of the tools extending toward the rear of the machine and located in a plane parallel to the plane of the cross-slide movement.

From the foregoing it will be apparent that the machine provides for a separation of the boring tools from the surface of the work being bored during the axial retraction of the boring spindles from within the workpiece bores, this mechanism being applicable to positively rotated boring spindles and is alike applicable to both single and multiple head boring machines. The structure by which the tools are retracted is externally of the boring spindles so that said spindles may be nearly as large as the opening being bored to provide for a greater rigidity.

We claim:

1. In a boring machine, a rotary boring spindle, a work-support, means for procuring a relative axial movement between the support and the spindle for a boring operation on the work, means for procuring a relative shifting movement between the work and the spindle in a direction radially of the spindle, and means rendered operative in response to the relative shifting movement for stopping the spindle with the tool in the end thereof projecting in a direction opposite to that of the shifting movement.

2. In a boring machine, a rotary boring spindle, a work-support, means for procuring a relative axial movement between the support and the spindle for a boring operation on the work, means for procuring a relative shifting movement between the work and the spindle in a direction radially of the spindle, and means rendered operative in response to the relative shifting movement for stopping the rotation of the spindle.

3. In a boring machine, a rotary boring spindle, a work-support, means for procuring a relative axial movement between the support and the spindle for a boring operation on the work means for procuring a relative shifting movement between the work and the spindle in a direction radially of the spindle, and means responsive to the relative radial movement for reversing the direction of rotation of the spindle.

4. In a boring spindle, a rotary boring spindle, a work-support, means for procuring a relative axial movement between the support and the spindle for a boring operation on the work, means for procuring a relative shifting movement between the work and the spindle in a direction radially of the spindle, means responsive to the radial movement for reversing the direction of rotation of the spindle, and means for stopping the reversed rotation of the spindle with the tool extending on a direction opposite to that of the relative radial movement.

5. In a boring machine, a boring head having a boring spindle therein, a reciprocatory table for procuring a relative movement between the boring head and a workpiece in a direction axially of the boring spindle, a cross-slide for procuring a shifting movement between the boring head and the workpiece in a direction radially of the spindle, means normally operative for clamping the cross-slide against movement, and means responsive to the table movement and operative at one end of the table stroke for releasing said clamp and for procuring movement of the cross-slide.

6. In a boring machine, a boring head having a boring spindle therein, a recprocatory table for procuring a relative movement between the boring head and a workpiece in a direction axially of the boring spindle, a cross-slide for procuring a shifting movement between the boring head and the workpiece in a direction radially of the spindle, means normally operative for clamping the cross-slide against movement, means for shifting said cross-slide, and interlocking means between the clamping means and the shifting means for releasing the clamping means before the shifting means are operative.

7. In a boring machine, a boring head having a boring spindle therein, a reciprocatory table for procuring a relative movement between the boring head and a workpiece in a direction axially of the boring spindle, a cross-slide for procuring a shifting movement between the boring head and the workpiece in a direction radially of the spindle, said cross-slide having a shifting movement only great enough to space the tool from the workpiece bore without affecting the withdrawal of the spindle from the bore, and positively acting stop means for limiting the movement of the cross-slide in each direction.

8. In a boring machine, a boring spindle, a reciprocatory table for procuring a relative movement between said spindle and a workpiece in a direction axially of the spindle, a cross-slide for procuring a relative movement between the spindle and the work in a direction radially of the spindle, means responsive to the table movement for procuring rotation of the spindle, and means responsive to movement of the cross-slide for reversing the rotation of the spindle, and a latch mechanism rendered operative by the cross-slide movement for stopping the spindle in a predetermined position.

9. In a boring machine, a boring spindle, a table having a reciprocatory movement for procuring a relative movement between the spindle and a workpiece in a direction axially of the spindle, a cross-slide for procuring a relative movement between the spindle and the workpiece in a direction radially of the spindle, means responsive to the table movement and operative at one end thereof for procuring movement of the cross-slide in one direction and other means responsive to the table movement and operative at the opposite end of said table movement for returning the cross-slide to original position.

10. In a boring machine, a boring spindle, a table having a reciprocatory movement for procuring a relative movement between the spindle and a workpiece in a direction axially of the spindle, a cross-slide for procuring a relative movement between the spindle and the workpiece in a direction radially of the spindle, means for automatically reversing the direction of rotation of the spindle, and a latch actuated by the movement of the cross-slide and engageable with the spindle when reversed for stopping the reversed rotation of the spindle at a predetermined point.

11. In a boring machine, a boring spindle, a table having a reciprocatory movement for procuring a relative movement between the spindle and a workpiece in a direction axially of the spindle, a cross-slide for procuring a relative movement between the spindle and the workpiece in a direction radially of the spindle, means responsive to the movement of the cross-slide for reversing the direction of rotation of the spindle, and a latch actuated by the cross-slide for engagement with the spindle during its reversed rotation to stop said rotation at a predetermined point.

12. In a boring machine, a boring spindle, a table having a reciprocatory movement for procuring a relative movement between the spindle and a workpiece in a direction axially of the spindle, a cross-slide for procuring a relative movement between the spindle and the workpiece in a direction radially of the spindle, means responsive to the table movement and operative at one end thereof for procuring movement of the cross-slide in one direction and also reversal of direction of rotation of the boring head spindles, and a time-controlled switch set in operation by the movement of the cross-slide for procuring a reversal of the table movement a predetermined time after the reversal of the rotation of the boring tool.

13. In a boring machine, a boring spindle, a table having a reciprocatory movement for procuring a relative movement between the spindle and a workpiece in a direction axially of the spindle, a cross-slide for procuring a relative movement between the spindle and the workpiece in a direction radially of the spindle, means responsive to the table movement and operative at one end thereof for procuring movement of the cross-slide in one direction, means responsive to the cross-slide movement for reversing the direction of rotation of the boring spindle, and a time-controlled switch set in operation by the cross-slide movement for procuring a reversal of the table movement a predetermined time after the cross-slide movement.

WILLIAM D. SCHMIDT.
ALFRED P. BURNS.
LAWRENCE W. CORBETT.